United States Patent [19]
Kimura et al.

[11] Patent Number: 5,474,428
[45] Date of Patent: Dec. 12, 1995

[54] OIL PUMP DRIVING DEVICE FOR TRANSMISSION

[75] Inventors: Kiyoshi Kimura, Sayama; Kazuo Ooyama, Tokyo; Shuichi Fujimoto, Kawagoe; Makoto Kojima, Asaka, all of Japan

[73] Assignee: Honda Giken Kogyo Kabushiki Kaisha, Tokyo, Japan

[21] Appl. No.: 166,057

[22] Filed: Dec. 10, 1993

[30] Foreign Application Priority Data

Dec. 10, 1992 [JP] Japan ................. 4-352534

[51] Int. Cl.⁶ ............................. F04B 49/00
[52] U.S. Cl. ................. 417/16; 417/15; 417/17; 417/44.1; 417/223; 417/316; 192/48.92
[58] Field of Search .............. 74/661; 192/48.92, 192/113.32; 417/15, 16, 17, 223, 316, 44.1

[56] References Cited

U.S. PATENT DOCUMENTS

| | | | |
|---|---|---|---|
| 3,618,719 | 11/1971 | Marland et al. | 74/661 |
| 3,620,323 | 11/1971 | Maeda | 180/65 |
| 4,037,687 | 7/1977 | Krutz et al. | 417/223 |
| 4,098,144 | 7/1978 | Besel | 74/687 |
| 4,153,128 | 5/1979 | Heitmeyer | 180/65 |
| 4,283,968 | 8/1981 | Kalns | 74/701 |
| 4,388,977 | 6/1983 | Bader | 180/165 |
| 4,697,991 | 10/1987 | Tsukahara et al. | 192/48.92 |
| 4,702,125 | 10/1987 | Kalns | 74/695 |
| 4,813,234 | 3/1989 | Nikolaus | 417/223 |
| 4,925,370 | 5/1990 | Tallarita | 417/223 |
| 4,928,227 | 5/1990 | Burba | 364/424 |
| 5,158,152 | 10/1992 | Nemoto et al. | 184/6.12 |
| 5,158,164 | 10/1992 | Seaton | 192/48.92 |

*Primary Examiner*—Richard A. Bertsch
*Assistant Examiner*—Xuan M. Thai
*Attorney, Agent, or Firm*—Lyon & Lyon

[57] ABSTRACT

An oil pump driving device drives an oil pump combined with a transmission coupled to an engine for supplying working oil to lubricate the transmission and enable the transmission to make gear shifts. The transmission includes a first power transmitting mechanism for connecting the output shaft of an electric motor to the drive shaft of the oil pump, and a second power transmitting path for connecting the output shaft of the engine to the drive shaft of the oil pump. A controller for selecting one of the first and second power transmitting mechanisms at a time selects the first power transmitting mechanism to drive the oil pump with the electric motor when the rotational speed of the output shaft of the engine is lower than a predetermined speed, and selects the second power transmitting mechanism to drive the oil pump with the engine when the rotational speed of the output shaft of the engine exceeds the predetermined speed.

6 Claims, 7 Drawing Sheets

OIL PUMP DRIVING DEVICE FOR TRANSMISSION

BACKGROUND OF THE INVENTION

1. Field of the Invention

The present invention relates to an oil pump driving device adapted to be mounted on a transmission for supplying working oil to lubricate the transmission and control gear shifts or speed changes in the transmission.

2. Description of the Prior Art

Transmissions for use on automobiles have many mechanisms or members therein that need to be lubricated, and it is necessary to supply such mechanisms or members with working oil for lubrication while the transmission is in operation. Hydraulically operated clutches and brakes that are used to effect gear shifts or speed changes in transmissions are also required to be supplied with working oil under a predetermined hydraulic pressure (line pressure) for controlling the clutches and brakes, i.e., the gear shifts or speed changes. Such working oil is supplied by an oil pump mounted on the transmission. Heretofore, the oil pump has been mechanically coupled to and driven by an engine with which the transmission is combined. For example, Japanese laid-open patent publication No. 55-60758 discloses a mechanism for driving an oil pump with an engine through a shaft that extends through the turbine shaft of a torque converter and is directly coupled to the output shaft of the engine.

Japanese patent publication No. 53-22214 discloses a transmission which is supplied with working oil by an oil pump that can be driven by an electric motor rather than an engine associated with the transmission.

Another transmission disclosed in Japanese patent publication No. 51-18082 is supplied with working oil by an oil pump that is driven by an engine during operation of the engine. When the engine is not in operation, the oil pump is driven by an electric motor.

The amount of working oil supplied to lubricate the transmission and the amount of working oil supply to control the transmission to effect gear shifts or speed changes are considered to be substantially constant regardless of the rotational speed of the engine. Actually, the amount of working oil supplied to lubricate the transmission slightly increases with the rotational speed of the engine. However, since the rate of increase of the amount of working oil supplied to lubricate the transmission is very small compared with an increase in the rotational speed of the engine, the amount of working oil supplied to lubricate the transmission may be regarded as being substantially constant.

As disclosed in Japanese laid-open patent publication No. 55-60756 and Japanese patent publication No. 51-18082, if the oil pump is driven by the engine, then the working oil is discharged by the oil pump at a rate that increases substantially in proportion to the rotational speed of the engine. When the engine rotates in a high speed range, only a portion of the working oil discharged by the oil pump is put to use, and hence a large energy loss results from the operation of the oil pump.

More specifically, the amount of working oil that is required by the transmission for its operation has no direct bearing on the rotational speed of the engine. The minimum requirement is that the transmission be supplied with a predetermined amount of working oil when the engine is idling, i.e., the engine is rotating at a lowest speed. Therefore, the oil pump that is used should have a displacement capacity such that it can supply the transmission with such a predetermined amount of working oil when the engine is at an idling speed. As the rotational speed of the engine increases, the oil pump discharges an excessive amount of oil in proportion to the rotational speed of the engine, and hence the energy loss of the oil pump also increases.

According to Japanese patent publication No. 51-18082, the oil pump can be driven by the electric motor as described above. The purpose of the disclosed system is to drive the oil pump with the electric motor when the engine is shut off for emission control at the time the automobile is stopped at an intersection or the like. Therefore, it is necessary for the oil pump to have such a displacement capacity as to discharge working oil in an amount that is necessary to lubricate the transmission and control gear shifts in the transmission when the engine is idling. As a result, as the rotational speed of the engine increases, the energy loss of the oil pump increases.

The oil pump disclosed in Japanese patent publication No. 53-22214 is free of the above problem as it is driven by the electric motor rather than the engine. However, the electric motor suffers a durability problem because it needs to be energized at all times insofar as the engine is in operation. In view of battery capacity limitations, the electric motor should preferably be as small in size as possible for minimum electric energy consumption, but its durability generally tends to decrease as the size is reduced. Larger electric motors are generally more durable, but consume more electric energy, and demand larger batteries and hence larger oil pump driving systems.

SUMMARY OF THE INVENTION

It is therefore an object of the present invention to provide an oil pump driving device for transmissions which allows an oil pump to be relatively small in size.

Another object of the present invention is to provide an oil pump driving device for transmissions which causes a relative small energy loss in driving an oil pump.

Still another object of the present invention is to provide an oil pump driving device for transmissions which enables an oil pump to supply a required amount of working oil even when an engine is shut off.

According to the present invention, there is provided an oil pump driving device for driving an oil pump combined with a transmission coupled to an engine for supplying working oil to lubricate the transmission and enable the transmission to make gear shifts, the oil pump driving device comprising an electric motor adapted to be mounted on the transmission, a first power transmitting path for connecting an output shaft of the electric motor to a drive shaft of the oil pump, a second power transmitting path for connecting an output shaft of the engine to the drive shaft of the oil pump, and drive selection means for selecting one of the first and second power transmitting paths at a time. The drive selection means selects the first power transmitting path to drive the oil pump with the electric motor when the rotational speed of the output shaft of the engine is lower than a predetermined speed, and selects the second power transmitting path to drive the oil pump with the engine when the rotational speed of the output shaft of the engine exceeds the predetermined speed.

When the rotational speed of the output shaft of the engine is lower than the predetermined speed, i.e., is in a low-speed range, the oil pump is driven by the electric motor. Therefore, a required amount of working oil is supplied to the transmission when the engine is shut off or rotates in the low-speed range. When the rotational speed of the output shaft of the engine exceeds the predetermined speed, the oil pump is driven by the engine. Thus, the electric motor may be de-energized to save electric energy stored in the battery. Since the oil pump is driven by the engine only when the engine rotates in a high-speed range higher than the predetermined speed, the actual rotational speed range can be greatly lowered and the electric motor is only required to operate in a limited time interval rather than the same time interval as the engine. As a result, the oil pump according to the present invention more durable, may be smaller, and may suffer a less energy loss than the conventional oil pumps.

Preferably, the oil pump driving device may include a first one-way clutch disposed in the first power transmitting path for allowing drive forces to be transmitted only from the electric motor to the oil pump, and a second one-way clutch disposed in the second power transmitting path for allowing drive forces to be transmitted only from the engine to the oil pump. The drive selection means may control the electric motor to energize the electric motor at a speed corresponding to the predetermined speed to drive the oil pump with the electric motor when the rotational speed of the output shaft of the engine is lower than the predetermined speed, and to de-energize the electric motor to drive the oil pump with the engine when the rotational speed of the output shaft of the engine exceeds the predetermined speed.

Preferably, the drive selection means may control the electric motor to rotate at a relatively low speed when the amount of working oil required by the transmission is relatively small and to rotate at a relatively high speed when the amount of working oil required by the transmission is relatively large, the predetermined speed being of a relatively low value when the electric motor is rotated at the relatively low speed, and of a relatively high value when the electric motor is rotated at the relatively high speed.

The oil pump driving device may further comprise a first clutch disposed in the first power transmitting path and engageable and disengageable for selectively connecting and disconnecting the first power transmitting path to and from the electric motor and the oil pump, and a second clutch disposed in the second power transmitting path and engageable and disengageable for selectively connecting and disconnecting the second power transmitting path to and from the engine and the oil pump. The drive selection means may control the first and second clutches to engage the first clutch to drive the oil pump with the electric motor when the rotational speed of the output shaft of the engine is lower than the predetermined speed, and to engage the second clutch to drive the oil pump with the engine when the rotational speed of the output shaft of the engine is higher than the predetermined speed.

The above and other objects, features, and advantages of the present invention will become apparent from the following description when taken in conjunction with the accompanying drawings which illustrate preferred embodiments, of the present invention by way of example.

DETAILED DESCRIPTION OF THE PREFERRED EMBODIMENTS

Figure 1:
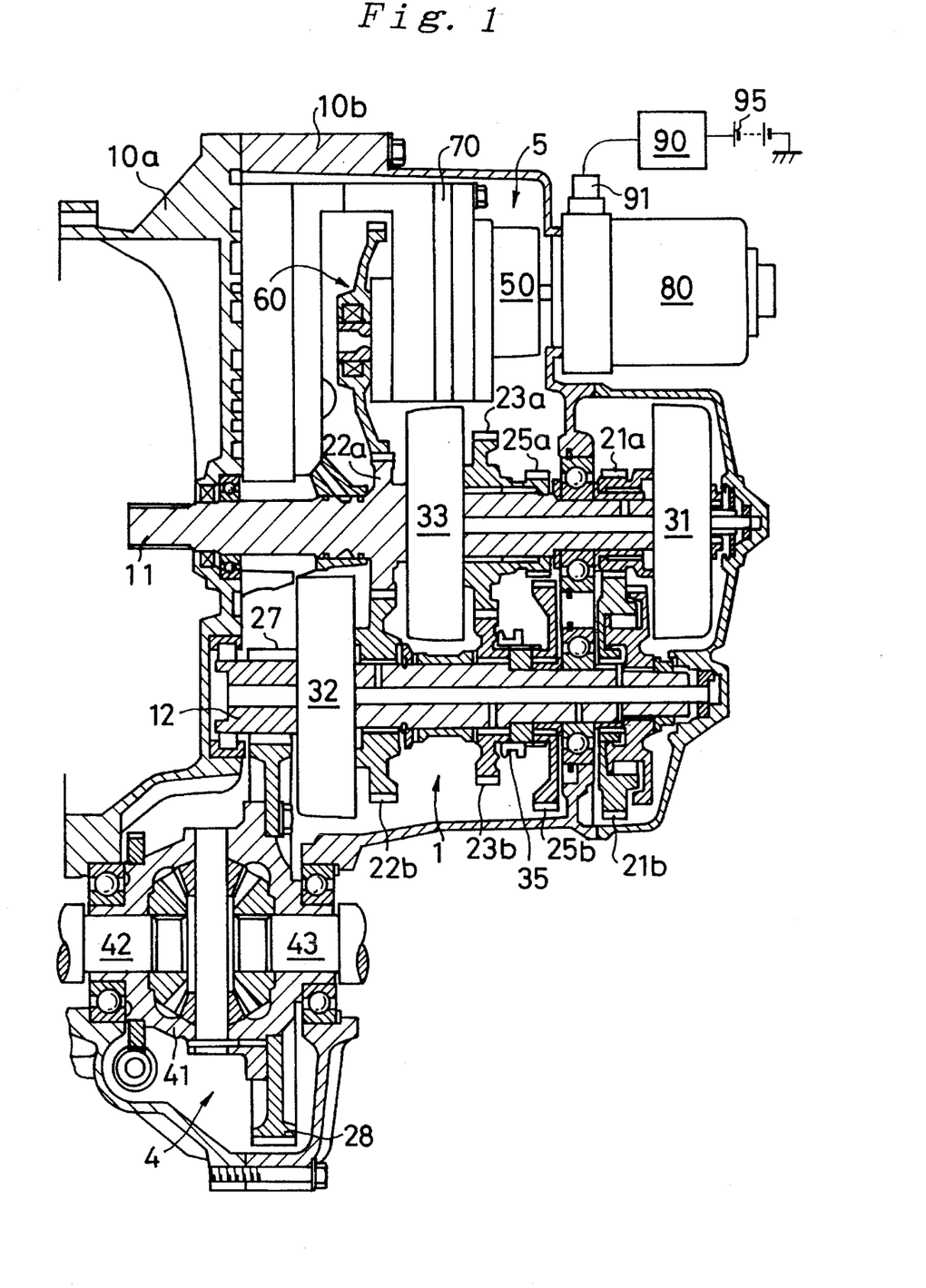
FIG. 1 is a cross-sectional view of a transmission which incorporates an oil pump driving device according to a first embodiment of the present invention.

As shown in FIG. 1, a transmission for use on an automobile, for example, has two housings 10a, 10b (shown on the left- and right-hand sides, respectively) joined to each other and defining a space which houses a transmission mechanism 1, a differential mechanism 4, and an oil pump driving device 5 according to a first embodiment of the present invention.

An engine E (see FIG. 3) associated with the transmission is coupled to a left-hand end of the housing 10a and has an output shaft connected to an input shaft (main shaft) 11 of the transmission through a coupling C such as a direct mechanical coupling, a friction clutch, a fluid coupling, a torque converter, or the like.

The transmission mechanism 1 includes the input shaft 11 which is disposed in and rotatably supported by the housings 10a, 10b, and a countershaft 12 disposed in and rotatably supported by the housings 10a, 10b parallel to the input shaft 11. The transmission mechanism 1 also has a plurality of power transmitting gear trains and clutches mounted on and disposed between the input shaft 11 and the countershaft 12.

The power transmitting gear trains include a first-position gear train composed of a drive gear 21a mounted on the input shaft 11 and a driven gear 21b mounted on the countershaft 12, the drive and driven gears 21a, 21b meshing with each other, a second-position gear train composed of a drive gear 22a mounted on the input shaft 11 and a driven gear 22b mounted on the countershaft 12, the drive and driven gears. 22a, 22b meshing with each other, a third-position gear train composed of a drive gear 23a mounted on the input shaft 11 and a driven gear 23b mounted on the countershaft 12, the drive and driven gears 23a, 23b meshing with each other, and a reverse-position gear train composed of a drive gear 25a mounted on the input shaft 11 and a driven gear 25b mounted on the countershaft 12, the drive and driven gears 25a, 25b meshing with each other through a reverse idler gear (not shown). The clutches include a first-position hydraulic clutch 31 mounted on the input shaft 11 for selecting a power transmitting mode effected by the first-position gear train, a second-position hydraulic clutch 32 mounted on the countershaft 12 for selecting a power transmitting mode effected by the second-position gear train, a third-position hydraulic clutch 33 mounted on the input shaft 11 for selecting a power transmitting mode effected by the third-position gear train, and a reverse-position dog clutch 35 mounted on the countershaft 12 for selecting a power transmitting mode effected by the reverse-position gear train.

One of the power-transmitting modes carried out by the first-, second-, third-, and reverse-position gear trains can therefore be selected by selectively engaging the clutches 31, 32, 33, 35 to transmit engine output rotational forces supplied from the engine E through the coupling C to the input shaft 11, to the countershaft 12 after its speed has been changed by the selected gear train. The rotational forces transmitted to the countershaft 12 are then transmitted through intermeshing output gears 27, 28 to the differential mechanism 4 (see FIG. 1). The rotational forces transmitted to the differential mechanism 4 are split by a differential gear train 41 and transmitted to a pair of axle shafts 42, 43, which then rotate respective wheels (not shown) coupled thereto.

Figure 2:
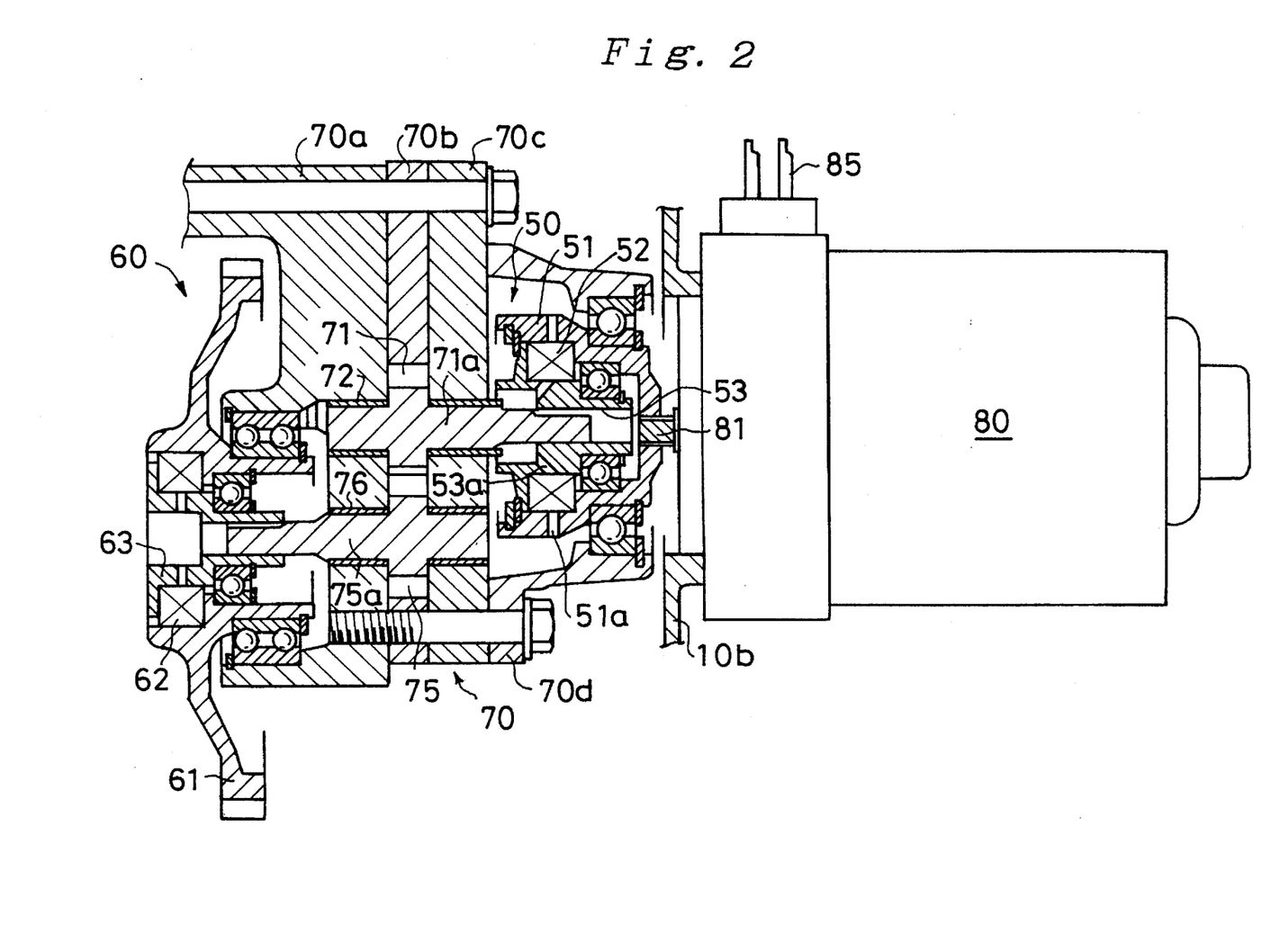
FIG. 2 is an enlarged cross-sectional view of the oil pump driving device.
Figure 3:
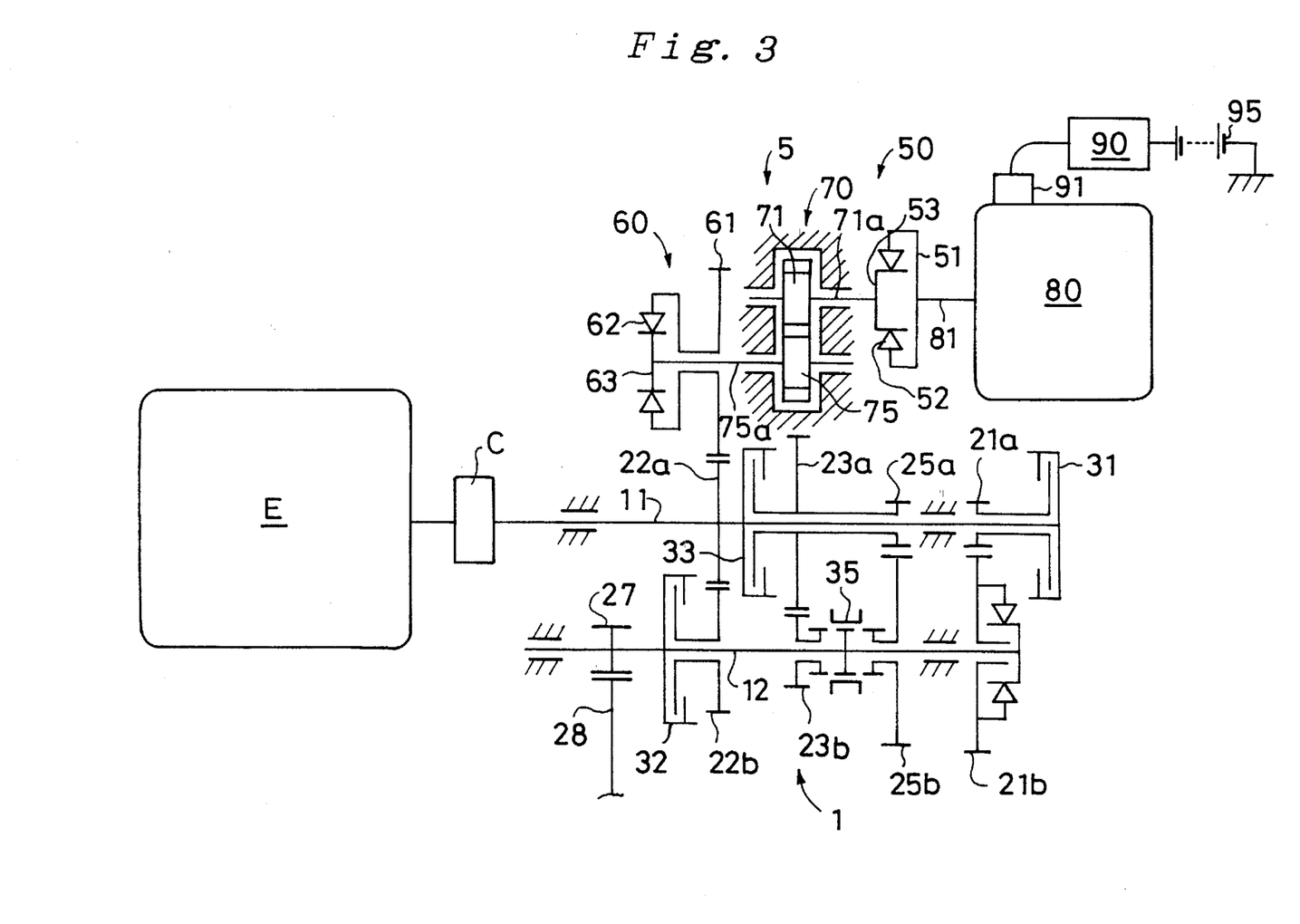
FIG. 3 is a schematic view showing a power transmitting structure of the transmission.

As shown in FIGS. 2 and 3, the oil pump driving device 5 comprises a gear oil pump 70 fixed to the housing 10a and housed in the housing 10b, an electric motor 80 mounted on the housing 10b and positioned outside of the housing 10b, a first power transmitting mechanism 50 for transmitting drive forces from the electric motor 80 to the oil pump 70, and a second power transmitting mechanism 60 for transmitting drive forces from the engine E through the input shaft 11 to the oil pump 70.

As shown in detail in FIG. 2, the oil pump 70 comprises first and second pump gears 71, 75 meshing with each other and rotatably supported by respective bearings 72, 76 in pump cases 70a, 70b, 70c that are fastened together to the housing 10a. The first pump gear 71 has a shaft 71a having an end (shown on the right-hand side) projecting into the first power transmitting mechanism 50 that is positioned on the right-hand side of the gear oil pump 70. The second pump gear 75 has a shaft 75a having an end (shown on the left-hand side) projecting into the second power transmitting mechanism 60 that is positioned on the left-hand side of the gear oil pump 70.

The first power transmitting mechanism 50 comprises an outer rotor 51 rotatably supported in a support member 70d fixed to the pump case 70c and splined to a drive shaft 81 of the electric motor 80, an inner rotor 53 relatively rotatably disposed coaxially in the outer rotor 51, and a first one-way clutch 52 disposed between the outer rotor 51 and the inner rotor 53. The inner rotor 53 is coaxially keyed to the shaft 71a of the first pump gear 71. When the electric motor 80 is energized, the drive shaft 81 thereof rotates and drives the first pump gear 71, i.e., the oil pump 70, through the first power transmitting mechanism 50. Since the first one-way clutch 52 is disposed between the outer rotor 51 and the inner rotor 53, the rotational drive forces from the electric motor 80 can be transmitted to the oil pump 70 in that direction only. The outer rotor 51 and the inner rotor 53 have respective lubricating oil holes 51a, 53a for introducing lubricating oil to lubricate the first one-way clutch 52.

The second power transmitting mechanism 60 comprises a pump drive gear 61 rotatably mounted on the pump case 70a and meshing with the drive gear 22a of the second-position gear train, the drive gear 22a being fixed to the input shaft 11, an inner rotor 63 relatively rotatably disposed coaxially in the pump drive gear 61, and a second one-way clutch 62 disposed between the pump drive gear 61 and the inner rotor 63. The inner rotor 63 is coaxially keyed to the shaft 75a of the second pump gear 75. When the engine E rotates, the input shaft 11 rotates and drives the second pump gear 75, i.e., the oil pump 70, through the second power transmitting mechanism 60. Since the second one-way clutch 62 is disposed between the pump drive gear 61 and the inner rotor 63, the rotational drive forces from the engine E can be transmitted to the oil pump 70 in that direction only. The pump drive gear 61 and the inner rotor 63 also have lubricating oil holes for introducing lubricating oil to lubricate the second one-way clutch 62.

As shown in FIGS. 1 and 3, a motor controller 90 is electrically connected to the electric motor 80 through a connector 91 that is joined to connector terminals 85 (see FIG. 2). The motor controller 90 also is connected to a conventional sensor (not shown) that senses the rotational speed Ne of the engine E. The motor controller 90 controls the supply of electric energy from a battery 95 to control the rotation of the electric motor 80. Therefore, it is possible to drive the oil pump 70 either with the electric motor 80 through the first power transmitting mechanism 50 or with the engine E through the second power transmitting mechanism 60 under the control of the motor controller 90. The motor controller 90 thus serves as a drive selection means for driving the oil pump 70 selectively with the electric motor 80 through the first power transmitting mechanism 50 or with the engine E through the second power transmitting mechanism 60.

A control sequence carried out by the motor controller 90 will be described below with reference to FIGS. 4 through 6.

Figure 4:
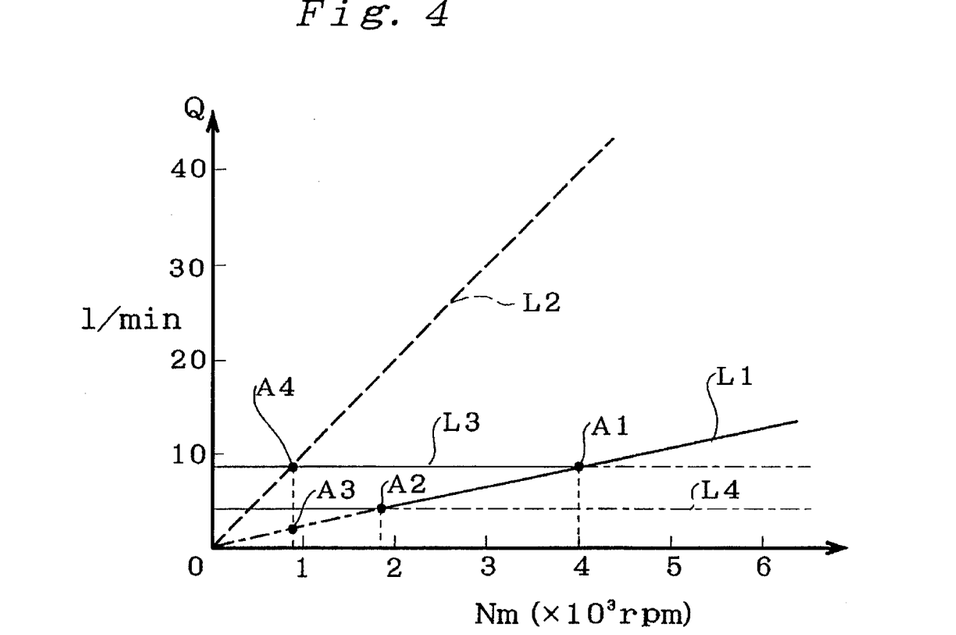
FIG. 4 is a graph showing oil discharging characteristics of an oil pump of the oil pump driving device.

FIG. 4 shows oil discharging characteristics of the oil pump 70. The graph of FIG. 4 has a vertical axis representing the amount Q of working oil discharged by the oil pump 70 and a horizontal axis representing the rotational speed Nm of the oil pump 70, as it is converted to the rotational speed of the input shaft 11. FIG. 4 illustrates a solid-line curve L1 indicating the oil discharging characteristics of the oil pump 70 according to the present invention, and a broken-line curve L2 indicating the oil discharging characteristics of a conventional oil pump that is directly coupled to the engine. A horizontal straight line L3 indicates the amount of working oil that is required by the transmission when it effects gear shifts or speed changes, and a horizontal straight line L4 indicates the amount of working oil that is required to lubricate various members of the transmission when it does not effect gear shifts or speed changes.

As can be understood from FIG. 4, when the engine is idling at a speed of about 900 rpm, the conventional oil pump discharges an amount of working oil indicated at a point A4. In an entire practical speed range of the engine, the amount of working oil discharged by the conventional oil pump, as indicated by the curve L2, exceeds the amount of working oil that is required when the transmission makes gear shifts, as indicated by the line L3. Therefore, the amount of working oil discharged by the conventional oil pump is sufficient under any conditions. However, as the rotational speed of the engine increases, the amount of working oil discharged by the conventional oil pump also increases, as indicated by the curve L2. The higher the rotational speed of the engine, the greater the amount of waste working oil discharged and hence the energy loss caused by the oil pump.

When the oil pump 70 according to the present invention is driven by the engine E, it discharges the amount of oil, indicated at a point A2, that is required to lubricate the transmission at the time the rotational speed of the engine E reaches a second predetermined speed of about 1800 rpm, and discharges the amount of oil, indicated at a point A1, that is required for the transmission to make gear shifts at the time the rotational speed of the engine E reaches a first predetermined speed of about 4000 rpm.

Stated otherwise, if the oil pump 70 were driven by only the engine E, the amount of working oil discharged by the oil pump 70 would not be large enough to lubricate the transmission or to enable the transmission to make gear shifts when the rotational speed of the engine E is lower than the first or second predetermined speed.

According to the present invention, the working oil is supplied to the transmission in a sufficient amount by controlling the electric motor 80 with the motor controller 90.

Figure 5:
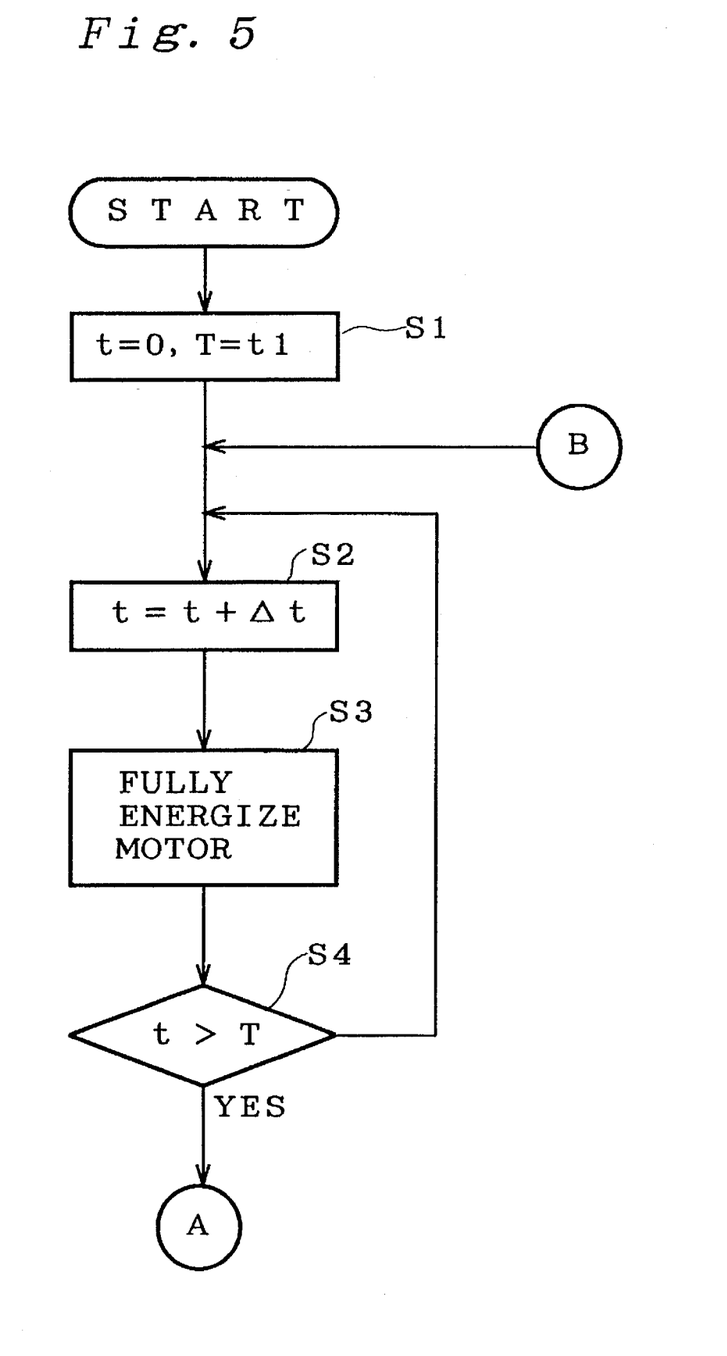
FIGS. 5 and 6 are a flowchart of the control sequence of the oil pump driving device.

More specifically, as shown in FIG. 5, when the ignition key of the automobile is turned on to start operating the motor controller 90, the motor controller 90 sets an integration time t to t=0 and a decision time T to T=t1 in a step S1. The motor controller 90 then fully energizes the electric motor 80 until t>T, i.e., during the decision time t1, in steps S2–S4. The oil passages in the transmission are now supplied with working oil.

Figure 6:
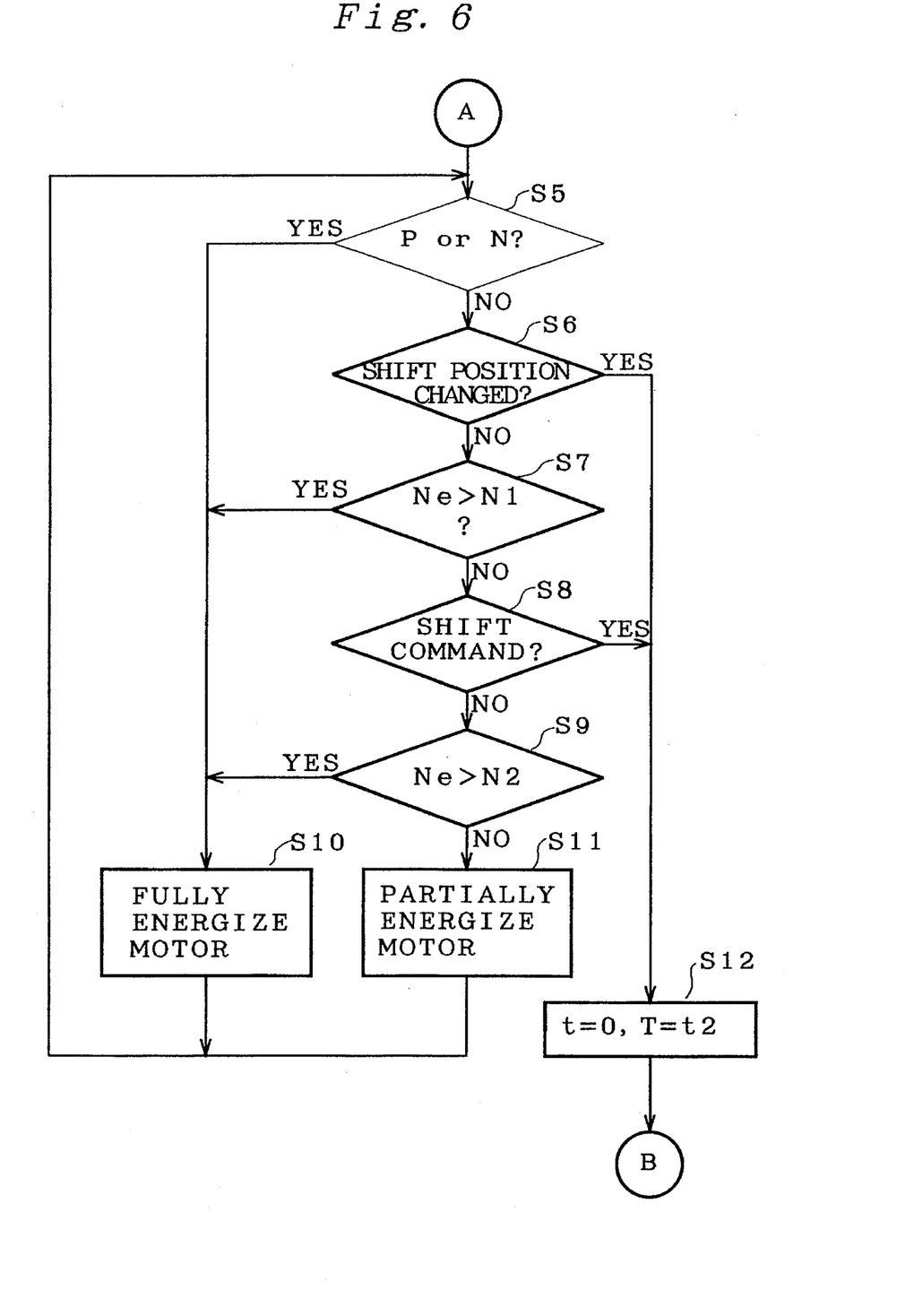

Then, control goes to a step S5 in FIG. 6 which determines whether or not the shift lever position of the transmission is in a P (parking) range or an N (neutral) range. If the shift lever position is in the P range or the N range, then since almost no working oil is required by the transmission for gear shifts and lubrication, the control jumps to a step S10 in which the motor controller 90 de-energizes the electric motor 80.

If the engine E is idling at this time, the rotation of the engine E is transmitted through the second power transmitting mechanism 60 to the oil pump 70, thus driving the oil pump 70. At this time, the oil pump 70 discharges a small amount of working oil indicated at a point A3 in FIG. 4. Since the transmission requires substantially no amount of working oil, no problem arises.

In the case where an electric motor is employed in place of the engine E to propel the automobile, this electric motor is de-energized in the P or N range, and no working oil is supplied to the transmission.

If the shift lever position is in neither the P range nor the N range, then control proceeds to a step S6 in which the motor controller 90 determines whether a shift lever position change has been made immediately before or not. If a shift lever position change has been made immediately before, then since the transmission is likely to make a gear shift, control goes to a step S12 in which the motor controller 90 sets the integration time t to t=0 and the decision time T to T=t2. Thereafter, the motor controller 90 fully energizes the electric motor 80 until t>T, i.e., during the decision time t2, in the steps S2–S4 shown in FIG. 5..

The displacement capacity of the oil pump 70 is selected such that the oil pump 70 discharges the amount of working oil indicated by the line L3 (FIG. 4) when the electric motor 80 is fully energized. At this time, therefore, the oil pump 70 can discharge the amount of oil that is required for the transmission to make gear shifts.

If no shift lever position change has been made immediately before, then the motor controller 90 determines whether the rotational speed Ne of the engine E, as it is converted to the rotational speed of the input shaft 11, is higher than a first predetermined speed N1, which corresponds to the point A1 and is about 4000 rpm. If Ne>N1, then control goes to the step S10 in which the motor controller 90. de-energizes the electric motor 80.

As described above, the first and second power transmitting mechanisms 50, 60 include the first and second one-way clutches 52, 62, respectively. Therefore, the oil pump 70 is driven by either the electric motor 80 or the engine E depending on the rotational speed of the oil pump 70 as converted from the rotational speed of the electric motor 80 or the engine E. Specifically, as can be seen from FIG. 4, if the rotational speed Ne of the engine E is lower than the first predetermined speed N1 when the electric motor 80 is fully energized, then the rotational speed of the oil pump 70 as converted from the rotational speed of the electric motor 80 is higher than the rotational speed of the oil pump 70 as converted from the rotational speed of the engine E. Therefore, the oil pump 70 is driven by the electric motor 80. Conversely, if the rotational speed Ne of the engine E is higher than the first predetermined speed N1 when the electric motor 80 is fully energized, then the rotational speed of the oil pump 70 as converted from the rotational speed of the engine E is higher than the rotational speed of the oil pump 70 as converted from the rotational speed of the electric motor 80. Therefore, the oil pump 70 is driven by the engine E.

Consequently, if Ne>N1 in the step S7, then since the oil pump 70 is driven by the engine E, the electric motor 80 is de-energized in the step S10, saving the electric energy stored in the battery 95 thereby to increase the service life thereof. At this time, the amount of working oil discharged by the oil pump 70 that is driven by the engine E is more than necessary to enable the transmission to make gear shifts.

If Ne≦N1 in the step S7, then the motor controller 90 determines whether there is a gear shift command or not in a step S8. If there is a gear shift command, then the electric motor 80 is fully energized in the steps S12, S2–S4 because the transmission needs the amount of working oil indicated by the line L3 in FIG. 4 to make gear shifts.

If there is no gear shift command in the step S8, then control proceeds to a step S9 determining whether the rotational speed Ne of the engine E, as it is converted to the rotational speed of the input shaft 11, is higher than a second predetermined speed N2, which corresponds to the point A2 and is about 1800 rpm.

If Ne>N2, then control goes to the step S10 in which the motor controller 90 de-energizes the electric motor 80. If Ne≦N2, then the motor controller 90 partially energizes the electric motor 80 in a step S11. When the electric motor 80 is partially energized, it rotates at a speed lower than the speed when it is fully energized, and the oil pump 70 driven thereby discharges the amount of working oil indicated by the line L4 that is required to lubricate various members of the transmission when it does not effect gear shafts or speed changes.

As can be understood from FIG. 4, when the electric motor 80 is partially energized, if the rotational speed Ne of the engine E is lower than the second predetermined speed N2, the oil pump 70 is driven by the electric motor 80. Conversely, if the rotational speed Ne of the engine E is higher than the second predetermined speed N2, the oil pump 70 is driven by the engine E.

Consequently, if Ne>N2 in the step S9, then since the oil pump 70 is driven by the engine E, the electric motor 80 is de-energized in the step S10, saving the electric energy stored in the battery 95 thereby to increase the service life thereof. At this time, the amount of working oil discharged by the oil pump 70 that is driven by the engine E is more than necessary to lubricate the members of the transmission when it does not make gear shifts.

If Ne≦N2 in the step S9, then the motor controller 90 partially energizes the electric motor 80. The oil pump 70 is thus driven by the electric motor 80, discharging the amount of working oil indicated by the line L4 that is required to lubricate various members of the transmission when it does not effect gear shafts or speed changes.

An oil pump driving device according to a second embodiment of the present invention will be described below with reference to FIGS. 7 and 8.

Figure 7:
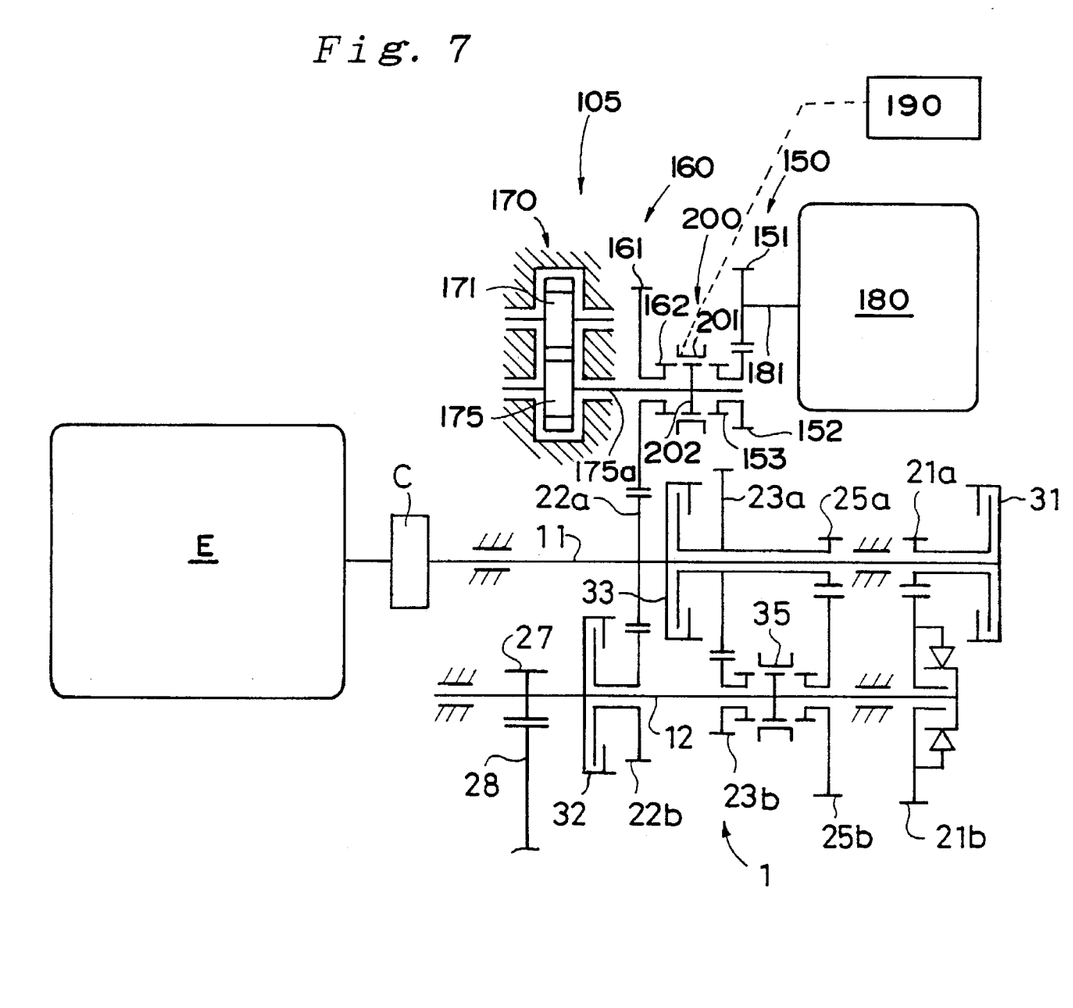
FIG. 7 is a schematic view showing a power transmitting structure of a transmission which incorporates an oil pump driving device according to a second embodiment of the present invention.

FIG. 7 schematically shows a transmission incorporating the oil pump driving device, generally denoted by 105, according to the second embodiment of the present invention. The transmission shown in FIG. 7 is essentially identical to the transmission shown in FIGS. 1 through 3, except for the oil pump driving device 106. Therefore, those parts of the transmission shown in FIG. 7 which are identical to those of the transmission shown in FIGS. 1 through 3 are denoted by identical reference characters, and will not be described in detail below.

The oil pump driving device 106 comprises a gear oil pump 170 fixed to the transmission housing, an electric motor 180 mounted on the transmission housing, a first power transmitting mechanism 150 for transmitting drive forces from the electric motor 180 to the oil pump 170, a second power transmitting mechanism 160 for transmitting drive forces from the engine E through the input shaft 11 to the oil pump 170, and a drive selection dog clutch 200 positioned between the first and second power transmitting mechanisms 150, 160 for transmitting drive forces selectively through the first and second power transmitting mechanisms 150, 160 to the oil pump 170.

The oil pump 170 comprises first and second pump gears 171, 175 meshing with each other and rotatably supported in a pump case that is fastened to the transmission housing. The second pump gear 175 has a shaft 175a having an end (shown on the right-hand side) projecting into the drive selection dog clutch 200.

The drive selection dog clutch 200 comprises a clutch hub 202 coaxially coupled to the shaft 175a of the second pump gear 175, and a sleeve 201 axially slidably mounted on the clutch hub 202.

The first power transmitting mechanism 150 comprises a first drive gear 151 mounted on a drive shaft 181 of the electric motor 180, and a second drive gear 152 meshing with the first drive gear 151 and rotatably mounted on the shaft 175a of the second pump gear 175. A first clutch gear 153 is integrally formed with a left-hand end of the second drive gear 152 and positioned axially adjacent to the clutch hub 202.

The second power transmitting mechanism 160 comprises a third drive gear 161 meshing with the drive gear 22a of the second-position gear train and rotatably supported on the shaft 175a of the second pump gear 175. A second clutch gear 162 is integrally formed with a right-hand end of the third drive gear 161 and positioned axially adjacent to the clutch hub 202.

The first power transmitting mechanism 150 or the second power transmitting mechanism 160 may be selected for transmitting drive forces to the oil pump 170 when the sleeve 201 of the drive selection dog clutch is axially moved to the right or left. Specifically, when the sleeve 201 is moved to the right, it engages both the clutch hub 202 and the first clutch gear 153, connecting the first power transmitting mechanism 150 to the oil pump 170. Therefore, the oil pump 170 can be driven by the electric motor 180 through the first power transmitting mechanism 150. When the sleeve 201 is moved to the left, it engages both the clutch hub 202 and the second clutch gear 162, connecting the second power transmitting mechanism 160 to the oil pump 170. Therefore, the oil pump 170 can be driven by the engine E through the second power transmitting mechanism 160.

In this manner, either the first power transmitting mechanism 150 or the second power transmitting mechanism 160 is selected by the drive selection dog clutch 160. The sleeve 201 of the drive selection dog clutch 160 can be axially moved to the right or left under the control of a dog clutch controller 190 which serves as a drive selective means for driving the oil pump 170 selectively with the electric motor 180 through the first power transmitting mechanism 150 or with the engine E through the second power transmitting mechanism 160.

Figure 8:
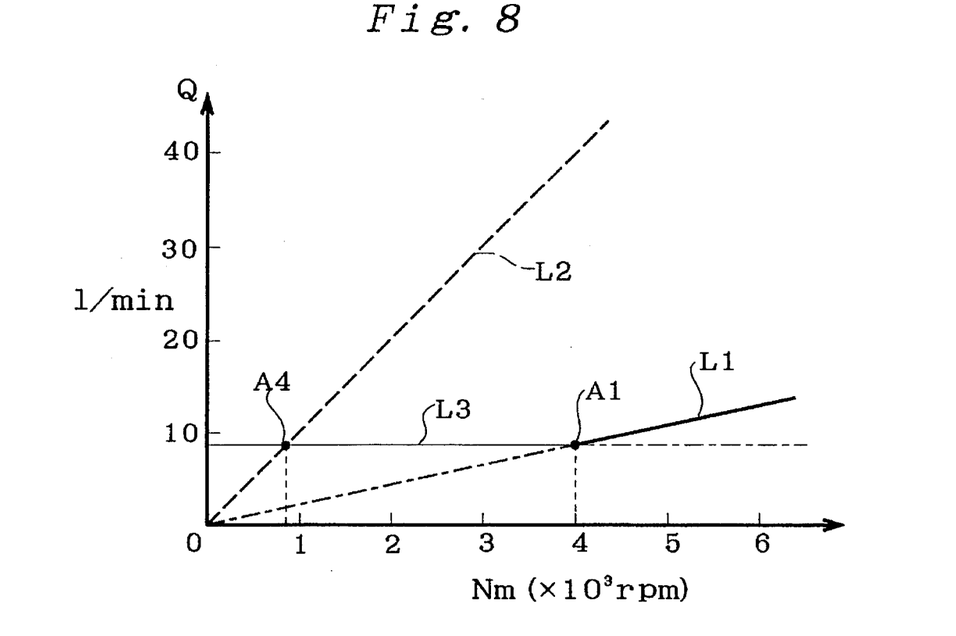
FIG. 8 is a graph showing oil discharging characteristics of an oil pump of the oil pump driving device shown in FIG. 7.

FIG. 8 illustrates oil discharging characteristics of the oil pump 170. The graph of FIG. 8 has a vertical axis representing the amount Q of working oil discharged by the oil pump 170 and a horizontal axis representing the rotational speed Nm of the oil pump 170 as converted to the rotational speed of the input shaft 11. FIG. 8 illustrates a solid-line curve L1 indicating the oil discharging characteristics of the oil pump 170 according to the present invention, and a broken-line curve L2 indicating the oil discharging characteristics of a conventional oil pump that is directly coupled to the engine. A horizontal straight line L3 indicates the minimum amount of working oil that is basically required by the transmission when it makes gear shifts or speed changes.

When the oil pump 170 is driven by the engine E, the oil pump 170 can discharge the amount of working oil that is required by the transmission only when the rotational speed of the engine E reaches a predetermined speed N1 of about 4000 rpm which corresponds to a point A1. Stated otherwise, if the oil pump 170 were driven by only the engine E, the amount of working oil discharged by the oil pump 170 would not be large enough to enable the transmission to make gear shifts when the rotational speed of the engine E is lower than the predetermined speed N1.

According to the second embodiment, the working oil is supplied to the transmission in a sufficient amount by controlling the drive selection dog clutch 200, i.e., the position of its sleeve 201, with the dog clutch controller 190 to drive the oil pump 170 with either the electric motor 170 or the engine E.

More specifically, when the rotational speed Ne of the engine E is lower than the predetermined speed N1, at point A1 then the dog clutch controller 190 moves the sleeve 201 to the right, connecting the first power transmitting mechanism 150 to the oil pump 170. The electric motor 180 is then energized to drive the oil pump 170 through the first power transmitting mechanism 150. The displacement capacity of the oil pump 170 is selected such that the oil pump 170 discharges the amount of working oil indicated by the line L3 (FIG. 8) when the electric motor 180 is energized. At this time, therefore, the oil pump 170 can discharge the sufficient amount of oil for the transmission to make gear shifts.

When the rotational speed Ne of the engine E is higher than the predetermined speed N1, then the dog clutch controller 190 moves the sleeve 201 to the left, connecting the second power transmitting mechanism 160 to the oil pump 170. The drive forces from the engine E are thus transmitted from the input shaft 11 through the second power transmitting mechanism 160 to the oil pump 170, which is driven to discharge an amount of working oil as indicated by the curve L1 (FIG. 8). At this time, therefore, the oil pump 170 can also discharge the sufficient amount of oil for the transmission to make gear shifts. The electric motor 180 is de-energized to save electric energy stored in the battery.

In the second embodiment, the amount of working oil required by the transmission is limited to a minimum level indicated by the line L3, and the electric motor 180 is rotated at a constant speed when energized, i.e., is either energized or de-energized. However, as shown in FIG. 4, the amount of working oil discharged by the oil pump 170 may be set to one level when the transmission makes gear shifts and a different level when the transmission does not make gear shifts, i.e., when it is lubricated, and the electric motor 180 may be controlled to rotate at different speeds, i.e., may be fully and partially energized, as with the control sequence as shown in FIGS. 5 and 6.

Although certain preferred embodiments of the present invention has been shown and described in detail, it should be understood that various changes and modifications may be made therein without departing from the scope of the appended claims.

What is claimed is:

1. An oil pump driving device for driving an oil pump combined with a transmission coupled to an engine for supplying working oil to lubricate the transmission and to make gear shifts, said oil pump driving device comprising:

an electric motor adapted to be mounted on the transmission;

a first power transmitting path for connecting an output shaft of said electric motor to a drive shaft of the oil pump;

a second power transmitting path for connecting an output shaft of the engine to the drive shaft of the oil pump;

motor control means for variably controlling the rotational speed of said electric motor;

said motor control means comprising means for rotating said electric motor at a speed corresponding to a predetermined speed of the engine when the rotational speed of the engine is lower than a predetermined speed;

said motor control means further comprising means for de-energizing said electric motor when the rotational speed of the engine is higher than said predetermined speed;

drive selection means for selecting one of said first and second power transmitting paths at a time;

said drive selection means comprising means for selecting said first power transmitting path when the rotational speed of the engine is lower than said predetermined speed;

said drive selection means further comprising means for selecting said second power transmitting path when the rotational speed of the engine is higher than said predetermined speed; and wherein said motor control means variably determines said predetermined speed based on the amount of working oil required by an operating condition of the transmission.

2. An oil pump driving device according to claim 1 wherein;

a first one-way clutch is disposed in said first power transmitting path for allowing drive forces to be transmitted only from said electric motor to said oil pump;

a second one-way clutch is disposed in said second power transmitting path for allowing drive forces to be transmitted only from said engine to said oil pump; and wherein when the rotational speed of said engine is lower than said predetermined speed said electric motor drives said oil pump by means of said first one-way clutch; and wherein when the rotational speed of said engine is higher than said predetermined speed, said engine drives said oil pump by means of said second one-way clutch.

3. An oil pump driving device according to claim 1 wherein said motor control means increases said predetermined speed as the amount of working oil required increases.

4. An oil pump driving device according to claim 1 wherein said motor control means sets said predetermined speed higher at the time a gear shift is executed in the transmission than is the predetermined speed at the time no gear shift is executed.

5. An oil pump driving device according to claim 1, further comprising:

a first clutch disposed in said first power transmitting path and engageable and disengageable for selectively connecting and disconnecting said first power transmitting path to and from said electric motor and said oil pump; and a second clutch disposed in said second power transmitting path and engageable and disengageable for selectively connecting and disconnecting said second power transmitting path to and from said engine and said oil pump;

said drive selection means comprising means for controlling said first and second clutches to engage said first clutch to drive said oil pump with said electric motor when the rotational speed of the output shaft of the engine is lower than said predetermined speed, and to engage said second clutch to drive said oil pump with said engine when the rotational speed of the output shaft of the engine is higher than said predetermined speed.

6. An oil pump driving device according to claim 5, wherein said transmission is required to be supplied with a first amount of working oil when the transmission is making a gear shift and a second amount of working oil when the transmission is not making a gear shift, said first amount of working oil being larger than said second amount of working oil, and said engine is required to rotate at a first predetermined speed to cause said oil pump to discharge said first amount of working oil and at a second predetermined speed to cause said oil pump to discharge said second amount of working oil when said oil pump is driven by said engine through said second power transmitting path, and wherein said drive selection means comprises means for engaging said first clutch when the rotational speed of the engine is lower than said first predetermined speed and engaging said second clutch when the rotational speed of the engine exceeds said first predetermined speed while said transmission is making a gear shift, and for engaging said first clutch when the rotational speed of the engine is lower than said second predetermined speed and engaging said second clutch when the rotational speed of the engine exceeds said second predetermined speed while said transmission is not making a gear shift.

* * * * *